J. W. TROY.
VEHICLE TOP SUPPORT.
APPLICATION FILED NOV. 24, 1909.
977,845.
Patented Dec. 6, 1910.
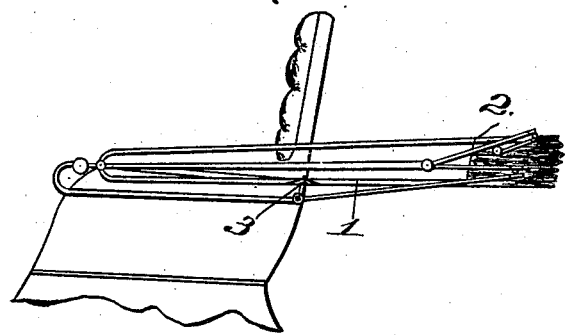
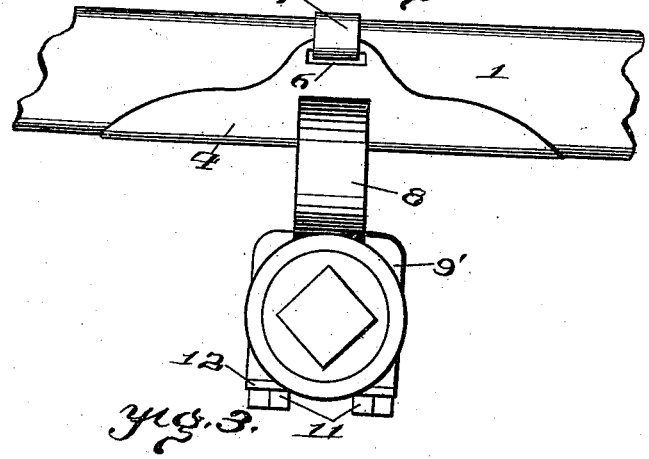
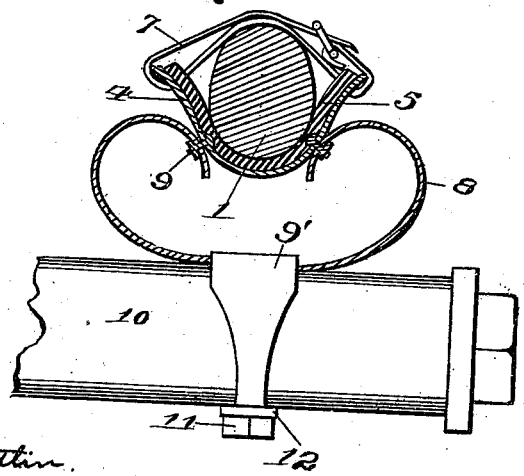
Witnesses
C. M. Cattin
E. M. Whalen
Inventor
JOHN W. TROY.
By Gould & Gould.
Attorneys

UNITED STATES PATENT OFFICE.

JOHN W. TROY, OF PORT HURON, MICHIGAN.

VEHICLE-TOP SUPPORT.

977,845.  Specification of Letters Patent.  Patented Dec. 6, 1910.

Application filed November 24, 1909. Serial No. 529,740.

*To all whom it may concern:*

Be it known that I, JOHN W. TROY, a citizen of the United States, residing at Port Huron, in the county of St. Clair and State of Michigan, have invented certain new and useful Improvements in Vehicle-Top Supports, of which the following is a specification.

The invention relates to that type of support for vehicle tops designed to relieve said tops, when in lowered position, of the jar and strain incident to travel.

The salient feature of the invention resides in a saddle-supporting spring so constructed and formed as to yieldingly support the saddle and contained bow between spaced terminals of the former in such manner as to overcome accidental vertical or lateral movement of the lowered bow.

One object of the invention is the provision of a top support which shall be easily adjusted to and disengaged from operative position and readily and effectually accomplish the above-mentioned function. With this as the main object, the invention will now be described in the following specification, taken in connection with the accompanying drawings, and then more particularly pointed out in the claim.

In the drawings, Figure 1 is a broken side elevation of a vehicle seat and top, my improved support being shown in operative relation to the lowered top, Fig. 2 is an enlarged, broken elevation of the support and connected bow, and Fig. 3 is a broken section, partly in elevation, transversely through the support and connected bow.

Referring now to the drawings, wherein is illustrated the preferred details of my invention, and wherein similar reference characters indicate similar parts throughout the several views, 1 denotes the back bows of a vehicle top 2, said bows being shown in operative engagement with the support 3.

4 indicates the bow saddle, formed preferably of sheet steel and of approximately U-shape in cross section, the lateral curvature being in conformity with that usually found in the rear surface of back bows of vehicle tops to provide that the latter shall rest snugly in desired relation to the saddle, said bows, when in said position contacting with a lining 5, disposed within the saddle throughout its approximate length and formed of a sheet of rubber or other appropriate resilient material.

Formed near the top edges of the side walls of the saddle and centrally of the length thereof are strap apertures 6 adapted to receive a binding strap 7, designed, after operatively engaging said apertures, to pass over the lowered top back bow and be drawn into and retained in taut condition and eliminate any tendency of said bow to be jolted out of engagement with the saddle, as obvious, said strap, as illustrated, passing through lining 5 and the side walls of the saddle at a point appreciably below the highest point of the lowered back bow and thus, in conjunction with said side walls, preventing the commonly-experienced disadvantageous lateral movement of the top and consequent strain thereof during ordinary travel. The saddle 4 is yieldingly supported by spring member 8, disposed beneath said saddle and formed by preference of spring steel as best meeting the requirements of the element. Spring 8 is removably connected to the saddle 4 by means of threaded bolts 9 or the like, the heads of said bolts seating in appropriate depressions formed in the lining 5, said connecting means providing for rigid contact of the saddle and spring while at the same time permitting unimpeded exercise of the resiliency of the spring to the largest degree, the position of the bolts and the form of the spring providing that neither the bolts nor any moving part of the spring is disposed in a plane of possible vertical movement of the bow, as obviously, the plane of said vertical movement would pass between the spaced terminals of the spring, while lateral movement of the bow in either direction is resisted by the tension of that curved portion of the spring with which the saddle contacts, the construction thus yieldingly resisting movement of the bow in any direction and quickly returning it to normal position.

9' denotes a clamp member, approximately U-shape, designed to pass over the lower portion of spring 8 and around the seat-rail stud 10, nuts 11, coöperating with cross-plate 12, screwing on the threaded lower portions of the arms of the cross member and rigidly attaching in removable manner the support as a whole in operative relation to the seat-rail stud.

From the foregoing it is obvious that I have provided a simple, effective support which is well adapted to receive and absorb the jars and strains which would, in the absence of the use of a support, be imposed upon the top, and result in loose pivots and a racked framework.

Having thus described my invention, what I claim as new and desire to secure by Letters Patent, is:—

A vehicle top support including a clamp to engage the seat rail stud, a spring including a strip secured between the clamp and stud and projecting in both directions beyond the clamp and formed to provide upwardly-extending independent coils, the terminals of the strip being disposed in spaced relation above the clamp, and a bow-receiving saddle secured to said spring terminals and lying between and above the same.

In testimony whereof, I affix my signature in presence of two witnesses.

JOHN W. TROY.

Witnesses:
HERBERT D. STONE,
FRED MERTZ.